United States Patent [19]
Dupin et al.

[11] Patent Number: 6,066,308
[45] Date of Patent: May 23, 2000

[54] ALUMINA AGGLOMERATES AND PROCESS FOR THE PREPARATION THEREOF

[75] Inventors: Thierry Dupin, Gonesse; Jean Lavina, Salindres; Regis Poisson, Asnieres, all of France

[73] Assignee: L'Institut Francais du Petrole, Rueil-Malmaison Cedex, France

[21] Appl. No.: 08/464,566

[22] Filed: Jun. 5, 1995

Related U.S. Application Data

[62] Division of application No. 08/082,107, Jun. 28, 1993, which is a division of application No. 07/863,140, Apr. 2, 1992, Pat. No. 5,244,648, which is a continuation of application No. 07/737,902, Jul. 26, 1991, abandoned, which is a continuation of application No. 07/169,121, Mar. 9, 1988, abandoned, which is a continuation of application No. 06/876,826, Jun. 20, 1986, abandoned, which is a continuation of application No. 06/508,575, Jun. 28, 1983, abandoned, which is a continuation-in-part of application No. 06/330,000, Dec. 11, 1981, abandoned.

[30] Foreign Application Priority Data

Dec. 23, 1980 [FR] France .................................. 80 27299

[51] Int. Cl.$^7$ .............................. B01D 53/00; C01F 7/00; C10G 25/00
[52] U.S. Cl. .......................... 423/659; 423/212; 423/628; 208/213; 585/640; 585/642
[58] Field of Search .................................. 208/213, 112, 208/135, 143; 423/212, 213.2, 213.5, 652, 567.1, 628, 659; 585/640, 642; 502/355

[56] References Cited

U.S. PATENT DOCUMENTS

| | | | |
|---|---|---|---|
| 2,651,617 | 9/1953 | Schmerling | 252/413 |
| 3,385,663 | 5/1968 | Hughes | 423/626 |
| 3,480,389 | 11/1969 | Graulier | 423/626 |
| 3,628,914 | 12/1971 | Graulier | 423/626 |
| 3,894,963 | 7/1975 | Gerdes et al. | 423/626 |
| 3,917,808 | 11/1975 | Leach et al. | 423/626 |
| 3,928,236 | 12/1975 | Rigge et al. | 423/631 |
| 3,944,658 | 3/1976 | Yoldas | 423/626 |
| 3,997,476 | 12/1976 | Cull | 423/626 |
| 4,159,313 | 6/1979 | Mercier et al. | 423/626 |
| 4,248,852 | 2/1981 | Wakabayashi et al. | 423/626 |
| 4,276,201 | 6/1981 | Sawyer | 423/628 |
| 4,344,928 | 8/1982 | Dupin et al. | 423/626 |
| 4,552,650 | 11/1985 | Toulhoat et al. | 208/254 H |
| 4,584,093 | 4/1986 | Toulhoat et al. | 208/254 H |
| 5,244,648 | 9/1993 | Dupin et al. | 423/628 |

FOREIGN PATENT DOCUMENTS 2496631  6/1982  France .................................. 423/626

*Primary Examiner*—Steven Bos
*Attorney, Agent, or Firm*—Burns, Doane, Swecker & Mathis, L.L.P.

[57] ABSTRACT

Provided is a process for preparing alumina agglomerates which comprises:

(i) treating agglomerates of active alumina with an aqueous medium comprising at least one acid making it possible to dissolve at least part of the alumina and at least one compound providing an anion capable of combining with aluminum ions in solution, (ii) subjecting the agglomerates to a hydrothermal treatment at a temperature in the range of from about 80° C. to about 250° C., and then (iii) thermally activating the agglomerates at a temperature in the range of about 500° C. to about 1100° C.

The resulting alumina agglomerates possess exceptional mechanical strength, heat resistance and hydrothermal resistance and are useful as catalysts or catalyst supports.

16 Claims, 1 Drawing Sheet

ALUMINA AGGLOMERATES AND PROCESS FOR THE PREPARATION THEREOF

CROSS REFERENCE TO RELATED APPLICATIONS

This application is a divisional of application Ser. No. 08/082,107, filed Jun. 28, 1993, which is a Divisional of application Ser. No. 07/863,140, filed Apr. 2, 1992, now U.S. Pat. No. 5,244,648, which is a continuation of application Ser. No. 07/737,902, filed Jul. 26, 1991, abandoned: which is a continuation of application Ser. No. 07/169,121, filed Mar. 9, 1988, abandoned; which is a continuation of application Ser. No. 06/876,826, filed Jun. 20, 1986, abandoned; which is a continuation of application Ser. No. 06/508,575, filed Jun. 28, 1983, abandoned; which is a continuation-in-part of application Ser. No. 06/330,000, filed Dec. 11, 1981, abandoned.

BACKGROUND OF THE INVENTION

1. Field of the Invention

The present invention relates to a process for the preparation of alumina agglomerates of controlled porosity, which agglomerates possess exceptional mechanical strength, heat resistance and hydrothermal resistance.

2. Description of the Prior Art

A process for the regeneration of a composite catalyst containing alumina by heating the spent catalyst in a medium containing a major proportion of acetic acid and a minor proportion of hydrochloric acid is disclosed in U.S. Pat. No. 2,651,617. The heat treatment is at a temperature of from 200 to 250° C. The process reduces the density of the spent catalyst by removing part of the alumina contained in the composite treated to thereby provide a porous particle. The acids are used in concentrated form, i.e., at least 60% strength by weight.

French Patent No. 1,222,830 discloses a process for the manufacture of alumina supports for catalysts which comprises treating the alumina at a temperature below 80° C. in a concentrated acid medium to thereby dissolve a portion of it. The dissolved portion is then removed in the form of aluminum chloride by washing with water.

French Patent No. 1,386,364, of common assignee, discloses a process for preparing alumina agglomerates possessing a high mechanical strength. In the process disclosed, agglomerates of active alumina are treated in an autoclave in the presence of water, dried and then calcined at a temperature providing the specific surface area and desired pore size.

According to U.S. Pat. Nos. 3,628,914 and 3,480,389, also of common assignee, alumina agglomerates are prepared of even higher mechanical strength than that obtained according to French Patent No. 1,386,364 by treating agglomerates of active alumina with an acid in an autoclave.

It is an object of the present invention, however, to provide alumina agglomerates of exceptional mechanical strength, heat resistance and hydrothermal resistance.

It is another object of the present invention to provide a process which makes it possible to obtain alumina agglomerates possessing a controlled porosity together with exceptional mechanical strength, i.e., attrition resistance and crushing strength.

It is still another object of the present invention to provide a process for preparing alumina agglomerates possessing not only a controlled porosity and excellent mechanical strength at high temperatures, but even in the presence of steam so that the alumina agglomerates exhibit valuable heat stability and hydrothermal stability.

It is further an object of the present invention to provide a process for preparing alumina agglomerates possessing all of the aforementioned desirable characteristics, and which does not result in any loss of alumina, in contrast to those processes described in U.S. Pat. No. 2,651,617 and French Patent No. 1,222,830.

These and other objects, as well as the scope, nature and utilization of the invention, will be apparent to those skilled in the art from the following description and the appended claims.

SUMMARY OF THE INVENTION

A process which achieves all of the aforegoing objectives has now been successfully developed. The alumina agglomerates obtained thereby can be used as catalysts or catalyst supports in any reaction which requires a particular pore structure together with very good mechanical, thermal and hydrothermal properties. Alumina agglomerates prepared by the process of the present invention find particular applicability in the treatment of the exhaust gases of internal combustion engines, in hydrodesulfurization, hydrodemetallation, and hydrodenitrification reactions, and, in general, in any hydrogen treatment of petroleum products.

The process of the present invention, which provides alumina agglomerates of controlled porosity, exceptional mechanical strength, heat resistance and hydrothermal resistance, is characterised in that:

(i) active alumina agglomerates are treated with an aqueous medium comprising at least one acid making it possible to dissolve at least part of the alumina of the agglomerates, and of at least one compound providing an anion capable of combining with the resulting aluminum ions in solution, (ii) subjecting the agglomerates, either simultaneously or subsequently to the aqueous medium treatment, to a hydrothermal treatment at a temperature between about 80° C. and about 250° C., preferably for a period of time ranging from about a few minutes to about 36 hours, and then (iii) drying the agglomerates, if appropriate, and subjecting same to thermal activation at a temperature in the range of from about 500° C. to about 1,100° C.

DETAILED DESCRIPTION OF THE INVENTION

Figure 1:
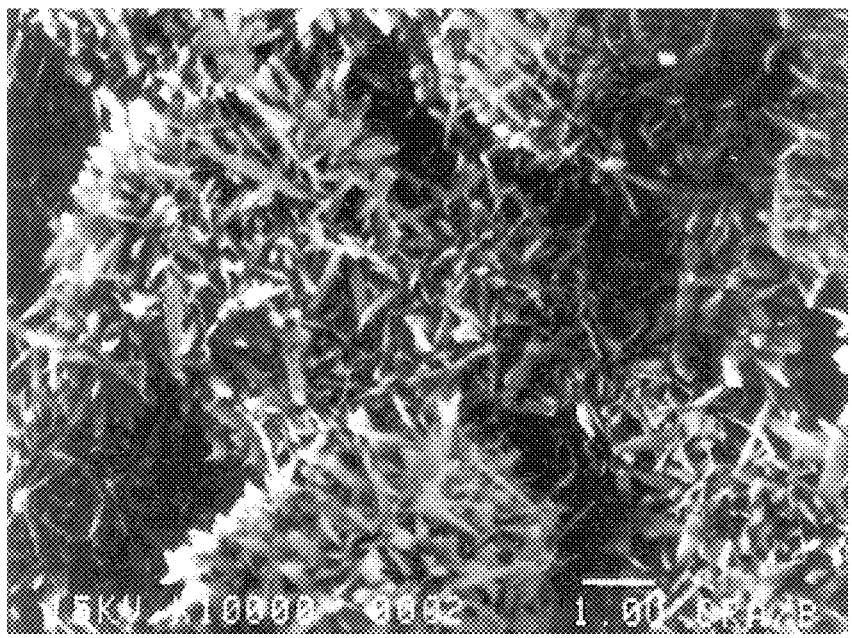
FIG. 1 depicts a scanning electron microscope image (magnification of 10,000X) of the surface of a fragment of an alumina agglomerate of the present invention obtained according to Example 1.

The agglomerates of active alumina used in the process of the present invention are prepared from a powder of active alumina having a poorly crystalline and/or amorphous structure, which can be obtained, for example, in accordance with a process such as that described in French Patent No. 1,438,497. Such a process consists of moistening active alumina having a poorly crystalline and/or amorphous structure by using an aqueous solution, agglomerating it, and aging the resulting agglomerates in a moist atmosphere at a relatively low temperature, preferably at a temperature between about 60 and 100° C. The agglomerates are dried and then calcined at a temperature between about 250° C. and about 900° C.

The expression "alumina of poorly crystalline structure" for the purposes of the aforegoing process is understood as meaning an alumina which is such that X-ray analysis gives a pattern which shows only one or a few diffuse lines corresponding to the crystalline phases of the low-temperature transition aluminas, and contains essentially the chi, rho, eta, gamma and pseudo-gamma phases and mixtures thereof.

By the expression "alumina of amorphous structure" is meant an alumina which is such that its X-ray analysis does not give any line characteristic of a crystalline phase.

The active alumina employed can be generally obtained by the rapid dehydration of aluminum hydroxides such as bayerite, hydrargillite or gibbsite, and nordstrandite, or of aluminum oxyhydroxides such as boehmite and diaspore. The dehydration can be carried out in any appropriate apparatus, and by using a hot gaseous stream. The temperature at which the gases enter the apparatus can generally vary from about 400 to 1,200° C. and the contact time of the hydroxide or oxyhydroxide with the hot gases is generally between a fraction of a second and 4 to 5 seconds.

The specific surface area of the active alumina obtained by the rapid dehydration of hydroxides or oxyhydroxides, as measured by the conventional BET method, generally varies between about 50 and 400 m$^2$/g, and the diameter of the particles is generally between 0.1 and 300 microns and preferably between 1 and 120 microns. The loss on ignition, measured by calcination at 1,000°, generally varies between 3 and 15%, which corresponds to a molar ratio H$_2$O/Al$_2$O$_3$ of between about 0.17 and 0.85.

In a preferred embodiment, an active alumina originating from the rapid dehydration of Bayer hydrate (hydrargillite), which is a readily available and inexpensive industrial aluminum hydroxide is employed. Active alumina of this type is well known to those skilled in the art and the process for its preparation has been described, for example, in French Patent No. 1,108,011.

The active alumina employed can be used as such or may be treated so that its sodium hydroxide content, expressed as Na$_2$O, is less than 1,000 ppm. The active alumina employed may or may not be ground.

The agglomeration of the active alumina is carried out in accordance with the methods well known to the art, and, in particular, by such methods as pelletizing, extrusion, shaping into beads in a rotating coating drum, and the like.

As is known to those skilled in the art, the agglomeration may be carried out with the addition of pore-forming agents to the mixture to be agglomerated. The pore-forming agents which can be used in particular, are wood flour, wood charcoal, cellulose, starches, naphthalene and, in general, all organic compounds capable of being removed by calcination.

If necessary, the aging, drying and/or calcination of the agglomerates are then carried out.

The agglomerates of active alumina used in accordance with the process of the present invention generally have the following characteristics: a loss on ignition, measured by calcination at 1,000° C., between about 1 and about 15%; a specific surface area between about 100 and about 350 m$^2$/g; and, a total pore volume between about 0.45 and about 1.2 cm$^3$/g.

The agglomerates of active alumina are treated in accordance with the process of the present invention, with an aqueous medium comprising a mixture of at least one acid making it possible to dissolve at least part of the alumina of the agglomerates, and of at least one compound providing an anion capable of combining with aluminum ions in solution.

By the expression "acid making it possible to dissolve at least part of the alumina of the agglomerates", as utilized herein, is meant any acid which, when brought into contact with the agglomerates of active alumina as defined above, brings at least some of the aluminum ions into solution. Generally, the acid must dissolve from 0.5% to about 15% by weight of alumina of the agglomerates. Its concentration in the aqueous treatment medium is generally less than 20% by weight and preferably between 1% and 15%.

It is preferred to use strong acids such as nitric acid, hydrochloric acid, perchloric acid and sulfuric acid. Weak acids used at a concentration such that their aqueous solution has a pH of less than about 4 can also be used.

By the expression "compound providing an anion capable of combining with the aluminum ions in solution", as utilized herein, is intended any compound which is able to release, in solution, an anion A$^{-n}$ capable of forming products with aluminum cations in which the atomic ratio

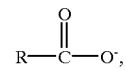

A particular illustration of such products are the basic salts of the general formula Al$_2$(OH)$_x$A$_y$, in which 0<x<6, ny<6 and n represents the number of charges on the anion A.

The concentration of this anion donor compound in the aqueous treatment medium is less than 50% by weight and preferably between 3% and 30%.

It is preferred to use compounds which release, in solution, nitrite, chloride, sulfate, perchlorate, chloroacetate, dichloroacetate, trichloroacetate, bromoacetate and dibromoacetate anions, as well as anions of the general formula $$R-\overset{\overset{\displaystyle O}{\|}}{C}-O^-,$$

in which R represents a radical selected from the group consisting of H, CH$_3$, C$_2$H$_5$, CH$_3$CH$_2$CH$_2$ and (CH$_3$)$_2$CH.

The compounds which are capable of releasing the anion A$^{-n}$ in solution can effect this release either directly, for example by dissociation, or indirectly, for example by hydrolysis. Illustrative compounds include, in particular, mineral or organic acids, anhydrides, organic or inorganic salts, and esters. Among the inorganic salts, there may be mentioned water soluble alkali metal or alkaline earth metal salts, such as salts of sodium, potassium, magnesium or calcium, ammonium salts, aluminum salts and rare earth salts.

This first treatment can be carried out either by dry impregnation of the agglomerates, or by immersion of the agglomerates in an aqueous solution of the mixture of acid and anion donor compound. By the expression "dry impregnation" as used herein is meant the contacting of the alumina agglomerates with a volume of solution which is less than or equal to the total pore volume of the agglomerates treated.

In a preferred embodiment of the present invention, mixtures of nitric acid and acetic acid or of nitric acid and formic acid are used as the aqueous medium.

The aforedescribed treated agglomerates are simultaneously or subsequently subjected to a treatment at a temperature between about 80 and about 250° C., for a period of time of between about a few minutes and about 36 hours.

This hydrothermal treatment does not result in any loss of alumina.

The treatment is preferably carried out at a temperature between 120 and 220° C., for a period of time of between 15 minutes and 18 hours.

The treatment constitutes a hydrothermal treatment of the agglomerates of active alumina, which effects the conversion of at least some of the agglomerates to boehmite. The hydrothermal treatment can be carried out either under saturated steam pressure or under a partial steam pressure equal to at least 70% of the saturated steam pressure which corresponds to the treatment temperature.

Without being limited to theory, it is believed that the association of the acid, which is capable of dissolving at least part of the alumina with the aforediscussed anion during the hydrothermal treatment results in the production of a particular boehmite which imparts, to the calcined agglomerates, their excellent heat resistance and hydrothermal resistance.

Furthermore, since the concentration of the acid and anion donor compound in the treatment mixture and the conditions of the hydrothermal treatment used are such that there is no loss of alumina, the increase in the porosity following the treatment is therefore due to an expansion of the agglomerates during the treatment and not to a loss of alumina.

The agglomerates thus treated are then dried, if deemed appropriate, at a temperature which is generally between 100 and 200° C., for a sufficient period of time to remove the water which is not chemically bound. The agglomerates are then subjected to a thermal activation treatment at a temperature in the range of from about 500° C. to about 1,100° C. for a period of time generally between about 15 minutes and 2 hours.

The activation treatment can be carried out in several steps, with the activation most preferably being carried out at a temperature in the range of from about 550 to about 950° C. Depending on the particular activation temperature employed, the alumina agglomerates predominantly exhibit the crystal structure characteristic of their boehmite filiation.

The alumina agglomerates prepared according to the present invention are characterized by the juxtaposition of a plurality of elementary units, designated agglomerates, each agglomerate being comprised by a plurality of acicular platelets, generally oriented with respect to each other as the radii of a sphere, the center of which coincides with that of the agglomerate. As a general rule, at least 50% of the acicular platelets, have a dimension along their axis of greatest development between about 0.05 and 5 microns and preferably between about 0.1 and 2 microns, a ratio of this dimension to their average width of between about 2 and 20 and preferably between about 5 and 15, a ratio of this dimension to their average thickness of between about 1 and 500 and preferably between about 10 and 200. A large proportion, for example at least about 50% of the agglomerates of acicular platelets, comprise a collection of substantially or pseudo-spherical particles of an average size of about 1 to 20 microns, preferably between about 2 and 10 microns. A highly adequate image to represent such a structure is, for example, a pile of prickly chestnut burs, or a pile of sea-urchins.

Figure 2:
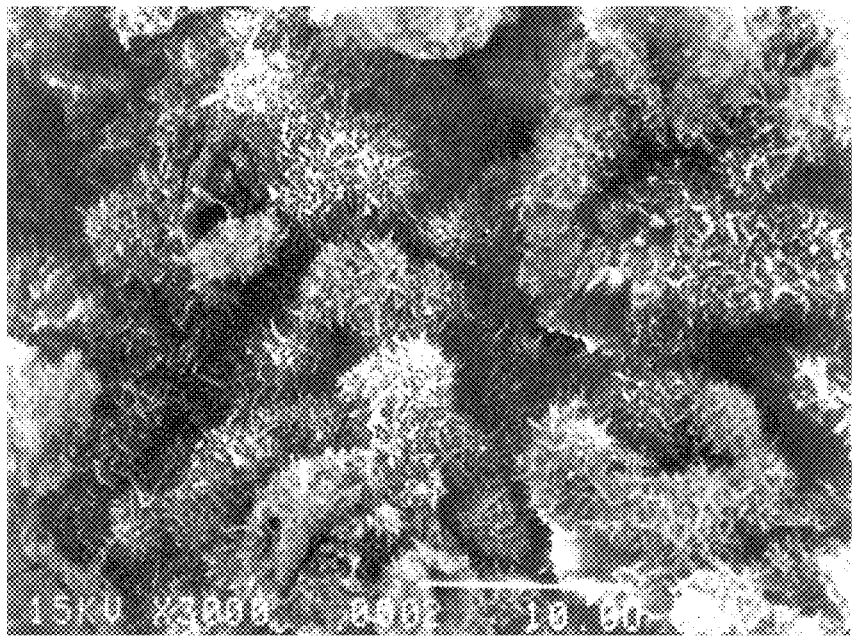
FIG. 2 depicts a scanning electron microscope image (magnification of 3000X) of a group of alumina agglomerates prepared according to the present invention.

The technique of scanning electron microscopy makes it possible to characterize without ambiguity by means of micrographs an alumina agglomerate of the present invention. FIGS. 1 and 2 depict alumina agglomerates according to the present invention, which illustrate well the particular structure of juxtaposed urchins described hereinabove.

The active alumina agglomerates prepared by the process of the present invention generally possess the following physical properties:

A tapped density (TD) of between about 0.36 and about 0.75 g/cm$^3$. This TD is measured in the following manner: A given weight of agglomerates is introduced into a graduated cylinder. The cylinder is then caused to vibrate until all settling has ceased and until a constant volume is obtained. The weight of agglomerates per unit volume is then calculated.

A total pore volume (TPV) of from about 0.35 to about 1.50 cm$^3$/g. The TPV is determined from the particle density and the absolute density, with the particle density (Dp) and absolute density (Da) being measured by the pycnometry method respectively using mercury and helium. The TPV is given by the formula $$TPV = \frac{1}{Dp} - \frac{1}{Da}$$

A distribution of pore volumes according to the size of the pores (DIS), such that:

| $\phi$ in Å | <100 | 100–1,000 | 1,000–5,000 | 5,000–10,000 | >10,000 |
|---|---|---|---|---|---|
| v cm$^3$/g | 0–0.10 | 0.40–0.90 | 0–0.60 | 0–0.55 | 0.040 | in which $\Phi$ represent the diameter of the pores and v the volume of the pores having a diameter between the limits indicated.

The DIS in the agglomerates is determined by the mercury penetration technique, in which Kelvin's law is applied, and which gives the relationship between the pressure, the diameter of the smallest pore into which the mercury penetrates at the said pressure, the contact angle and the surface tension, according to the formula:

$$\Phi = \frac{4t \cos \theta}{p}$$

in which $\Phi$ represents the diameter of the pore, t the surface tension, o the contact angle and p the pressure.

A specific surface area (SSA), as measured by the B.E.T. method, of from about 80 to about 200 m$^2$/g.

A mechanical strength (PPC) of from about 2 to about 29 kg. The mechanical strength is measured by the particle-by-particle crushing method (PPC). It consists in measuring the maximum compression force which a granule can withstand before it breaks by placing the product between two planes moving at a constant speed of 5 cm/minute. In the particular case of spheres, the force is expressed in kilograms. In the case of extrudates or pellets, the compression is applied perpendicularly to one of the generatrices of the product, and the particle-by-particle crushing is expressed as the ratio of the force to the length of the generatrix and will thus be in kilograms/mm.

The mechanical strength (PPC) is related to the total pore volume (TPV) by Schiller's law:

$$PPC = A \log \frac{B}{Dp} \times TPV$$

in which A and B are constants, Thus, when the porosity of a product (TPV) increases, the PPC decreases, and it is therefore difficult to manufacture products which are both porous and strong.

An attrition resistance (AR) of more than about 98%. The attrition resistance is measured as the percentage of product which is not worn away by friction in accordance with the following method: a given volume (60 cm$^3$) of agglomerate is introduced into an upturned Erlenmeyer flask of particular construction, which is connected to a metal inlet orifice. A large outlet orifice (2.54 cm) covered with a sieve of mesh size 1.168 mm is positioned in the bottom of the Erlenmeyer flask. A strong stream of dry nitrogen is passed through the inlet orifice. The nitrogen stream has two purposes, first, to cause the agglomerates to circulate and collide with one another, which results in their wear by friction, and second to cause the agglomerates to impact against the Erlenmeyer flask, which results in their degradation proportional to the intensity of the impact. The product is tested for 5 minutes and the weight of agglomerates remaining is measured. The decrease in weight after the experiment, expressed as a percentage of the initial charge, represents the attrition resistance AR.

A shrinkage (Sh) of less than 2% after heat treatment for 24 hours in dry air at 982° C. or 1093° C. The shrinkage is measured as the percentage decrease in volume of the agglomerates, which is determined in the following manner: A given amount of agglomerates is introduced into a graduated cylinder and the latter is vibrated until all settling has ceased and until a constant volume is obtained, as in measuring the TD. The agglomerates are then heat treated under dry air for 24 hours, either at 982° C. or at 1,093° C. The volume of the agglomerates after vibration is then again measured and the decrease in volume after the heat treatment is calculated, relative to the initial volume, and expressed as a percentage of the decrease in volume.

Furthermore, the agglomerates of the instant invention as prepared by the process thereof possess excellent properties after heat treatment or hydrothermal treatment.

After heat treatment at 982° C. (HT 982° C.) for 24 hours under dry air, their characteristics are generally as follows:

SSA>60 m$^2$/g

PPC between 2 and 20 kg

AR>98%

Sh<2%

After heat treatment at 1,093° C. (HT 1,093° C.) for 24 hours under dry air, agglomerates of the present invention which have been stabilized previously in accordance with the process disclosed in U.S. Pat. No. 4,061,594, of common assignee, generally possess the following characteristics:

SSA>50 m$^2$/g

PPC between 2 and 20 kg

AR>98%

After a hydrothermal treatment at 900° C. (HT H$_2$O, 900° C.) for 24 hours under a nitrogen atmosphere containing 10% steam, agglomerates of the present invention generally possess the following characteristics:

SSA>60 m$^2$/g

PPC between 2 and 20 kg

AR>98%

From the aforegoing properties, it is clearly evident that the process of the present invention provides agglomerates of active alumina which possess excellent mechanical, thermal and hydrothermal properties and a pore distribution which is readily adjusted within an extended range.

Moreover, the process of the present invention makes it possible, in particular and totally unexpectedly, to modify the pore volume distribution of the different pore sizes of the untreated agglomerates. For example, the proportion of pores between 100 and 1,000 Å, can be increased, and the proportion of pores less than 100 Å and greater than 5,000 and/or 10,000 Å can be reduced while only slightly modifying the proportion of pores between 1,000 and 5,000 Å. The process according to the present invention thus makes it possible to obtain, as is desired, microporous and/or macroporous products possessing exceptional properties.

The alumina agglomerates obtained via the process of the present invention can be employed as catalysts or catalyst supports. If so required, the alumina agglomerates can be heat-stabilized with rare earths, silica or alkaline earth metals as is well known to those skilled in the art. In particular, they can be stabilized in accordance with the process described in U.S. Pat. No. 4,061,594, of common assignee.

The alumina agglomerates of the present invention can be used, in particular, as catalyst supports in processes involving very rapid reactions with very limited internal diffusion, and in reactions lending to progressive poisoning of the catalyst. In such cases, the agglomerates of the present invention having a bimodal pore structure (containing micropores and macropores) are particularly effective, as the impurities are trapped in the macropores while the micropores remain catalytically active. Prepared agglomerates which are particularly suitable for such a purpose have, in particular, a pore distribution such that: the volume of pores with a diameter greater than 10,000 Å is greater than 0.10 cm$^3$/g, the volume of pores with a diameter between 1,000 Å and 10,000 Å is between 0.10 and 0.15 cm$^3$/g, the volume of pores with a diameter of between 100 and 1,000 Å is between 0.50 and 0.80 cm$^3$/g and the volume of pores with a diameter less than 100 Å is less than 0.05 cm$^3$/g.

The active alumina agglomerates of the present invention can thus find particular applicability as catalyst supports in the treatment of exhaust gases generated by internal combustion engines and in hydrogen treatments of petroleum products, such as hydrodesulfurization, hydrodemetallation and hydrodenitrification. They can also be used as catalyst supports in reactions for the recovery of sulfur from sulfur compounds (Claus catalysis), the dehydration, reforming, steam reforming, dehydrohalogenation, hydrocracking, hydrogenation, dehydrogenation, and dehydrocyclization of hydrocarbons or other organic compounds, as well as oxidation and reduction reactions.

If the agglomerates obtained in accordance with the process of the present invention are used as catalyst supports for treating the exhaust gases from internal combustion engines, the active phase thereof can advantageously be the one described in French Patent No. 79/24,675, of common assignee.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE 1

4 kg of alumina beads obtained in accordance with the process described in French Patent No. 1,438,497 were treated in a 10 liter reactor. The alumina beads possessed the following characteristics:

PPC: 1.0 kg

SSA: 192 m$^2$/g

TPV: 0.84 cm³/g
DIS:

| φ Å | <100 | 100–1,000 | 1,000–5,000 | 5,000–10,000 | >10,000 |
|---|---|---|---|---|---|
| v cm³/g | 0.06 | 0.04 | 0.05 | 0.05 | 0.28 |

The treatment was carried out in the vapor phase at a temperature of 195° C. for a period of 3 hours. The treatment medium consisted of a mixture of nitric acid and acetic acid. The concentration of nitric acid was 7 g per 100 g of $Al_2O_3$, and the concentration of acetic acid was 10 g per 100 g of $Al_2O_3$. The nitric acid made it possible to dissolve about 2.5% by weight of the alumina beads. The acetic acid provided acetate anion, which combined with the aluminum ions in solution to form compounds in which the atomic ratio

was less than 3.

The beads thus treated were thermally activated in a furnace at 900° C. for 1 hour and are depicted in FIG. 1.

The properties of the beads obtained were determined in accordance with the methods which have been described above. The beads possessed the following characteristics:
TD: 0.44 g/cm³
TPV: 1.05 cm³/g
DIS:

| φ Å | <100 | 100–1,000 | 1,000–5,000 | 5,000–10,000 | >10,000 |
|---|---|---|---|---|---|
| v cm³/g | 0.01 | 0.68 | 0.10 | 0.07 | 0.19 |

SSA: 107 m²/g
PPC: 3.6 kg
AR: 99.7%
HT 982° C.:

SSA: 75 m²/g
PPC: 3.3 kg
AR: 99.6%
Sh: 0.8%
HT 1,093° C.:

SSA: 71 m²/g
PPC: 3.8 kg
AR: 99.7%
HT $H_2O$, 900° C.:

SSA: 84 m²/g
PPC: 3.4 kg
AR: 99.4%

As can be seen from the aforegoing, these beads possess exceptional mechanical, thermal and hydrothermal properties. The treatment carried out made it possible, totally unexpectedly, to simultaneously increase the strength and pore volume of the beads. This apparent contradiction to Schiller's law is explained by a modification of the constants A and B due to the treatment effected. The treatment made is possible to virtually eliminate pores with a diameter less than 100 Å, to increase the number of pores with a diameter of between 100 and 1,000 Å and to slightly reduce the number of pores with a diameter greater than 10,000 Å.

EXAMPLE 2

4 kg of alumina beads prepared in accordance with the process described in French Patent No. 1,438,497 were treated in a 10 liter reactor. The beads possessed the following characteristics:
SSA: 135 m²/g
TPV: 0.82 cm³/g
DIS:

| φ Å | <100 | 100–1,000 | 1,000–5,000 | 5,000–10,000 | >10,000 |
|---|---|---|---|---|---|
| v cm³/g | 0.06 | 0.48 | 0.04 | 0.03 | 0.21 |

The treatment was carried out in the vapor phase at a temperature of 151° C. for a period of 15 hours. The treatment medium consisted of a mixture of nitric acid and formic acid, with the concentration of nitric acid being 7 g/100 g of $Al_2O_3$, and the concentration of formic acid being 6 g/100 g of $Al_2O_3$. The nitric acid resulted in a dissolution of about 2.5% of the alumina beads. The formic acid provided the formate anion, which combined with the aluminum ions in solution to form compounds in which the atomic ratio

was less than 2.5.

The beads thus treated were thermally activated in a furnace at 900° C. for 1 hour.

The properties of the beads prepared were tested in accordance with the methods which have been described above. The beads possessed the following characteristics:
TD: 0.49 g/cm³
TPB: 0.91 cm³/g
DIS:

| φ Å | <100 | 100–1,000 | 1,000–5,000 | 5,000–10,000 | >10,000 |
|---|---|---|---|---|---|
| v cm³/g | 0.02 | 0.57 | 0.04 | 0.11 | 0.17 |

SSA: 115 m²/g
PPC: 4.7 kg
AR: 99.4%
HT 982° C.:

SSA: 68 m²/g
PPC: 4.2 kg
AR: 99.6%
Sh: 1.1%
HT 1,093° C.:

SSA: 65 m²/g
PPC: 4.4 kg
AR: 99.3%
HT $H_2O$, 900° C.:

SSA: 69 m²/g
PPC: 4.5 kg
AR: 99.3%

EXAMPLE 3

The experiment of Example 1 was repeated, modified only in the characteristics of the starting beads, which were as follows:
SSA: 257 m²/g
TPV: 0.54 cm³
DIS: <100=0.49 cm³/g, 100–1,000=0.05 cm³/g The beads obtained after treatment as described in Example 1 possessed the following characteristics:

TD: 0.53 g/cm³

TPV: 0.82 cm³/g

DIS:

| φ Å | <100 | 100–1,000 | 1,000–5,000 | 5,000–10,000 | >10,000 |
|---|---|---|---|---|---|
| ν cm³/g | 0.02 | 0.66 | 0.10 | 0.04 | 0 |

SSA: 103 m²/g
PPC: 14 kg
AR: 99.8%
HT 982° C.:

SSA: 69 m²/g
PPC: 13.2 kg
AR: 99.6%
Sh: 0.9%
HT 1,093° C.:

SSA: 66 m²/g
PPC: 13.7 kg
AR: 99.4%
HT H₂O, 900° C.:

SSA: 75 m²/g
PPC: 12.5 kg
AR: 99.3%

As can be gained from the aforegoing properties, the beads possessed exceptional mechanical, thermal and hydrothermal properties. Treatment in accordance with the process of the present invention increased considerably the total pore volume, and in particular the pore volume of pores having a diameter between 100 and 1,000 Å. The treatment also resulted in a production of pores having a diameter between 1,000 and 10,000 Å.

EXAMPLE 4

The experiment of Example 1 was again repeated, this time modifying only the treatment conditions (temperature and time) of the beads in the aqueous medium. The physical characteristics and properties of the beads prepared and the treatment conditions are given in Table I below.

TABLE I

| TREATMENT CONDITIONS | Time in hours | | | | |
|---|---|---|---|---|---|
| | 2 | 3 | 4 | 6 | 0.5 |
| | T in ° C. | | | | |
| | 195 | 195 | 195 | 195 | 215 |
| CHARACTERISTICS OF THE BEADS OBTAINED | | | | | |
| TD (g/cm³) | 0.48 | 0.44 | 0.43 | 0.39 | 0.44 |
| TPV (cm³/g) | 0.93 | 1.05 | 1.09 | 1.24 | 1.04 |
| DIS | | | | | |
| <100 Å | 0.01 | 0.01 | 0.00 | 0 | 0.01 |
| 100–1,000 Å | 0.61 | 0.68 | 0.72 | 0.86 | 0.70 |
| 1,000–5,000 Å | 0.07 | 0.10 | 0.12 | 0.10 | 0.08 |
| 5,000–10,000 Å | 0.05 | 0.07 | 0.08 | 0.09 | 0.07 |
| >10,000 Å | 0.19 | 0.19 | 0.17 | 0.19 | 0.18 |
| SSA (m²/g) | 108 | 107 | 106 | 103 | 105 |
| PPC (kg) | 4.0 | 3.6 | 3.6 | 3.2 | 3.8 |
| AR (%) | 99.5 | 99.7 | 99.7 | 99.6 | 99.6 |

TABLE I-continued

| TREATMENT CONDITIONS | Time in hours | | | | |
|---|---|---|---|---|---|
| | 2 | 3 | 4 | 6 | 0.5 |
| | T in ° C. | | | | |
| | 195 | 195 | 195 | 195 | 215 |
| HT 982° C. | | | | | |
| SSA (m²/g) | 71 | 75 | 73 | 69 | 74 |
| PPC (kg) | 3.8 | 3.3 | 3.4 | 3.0 | 3.5 |
| AR (%) | 99.4 | 99.6 | 99.6 | 99.3 | 99.4 |
| Sh (%) | 1.2 | 0.8 | 0.7 | 0.5 | 0.7 |
| HT 1093° C. | | | | | |
| SSA (m²/g) | 67 | 71 | 69 | 65 | 69 |
| PPC (kg) | 3.8 | 3.8 | 3.4 | 3.1 | 3.7 |
| AR (%) | 99.3 | 99.7 | 99.6 | 99.2 | 99.6 |
| HT H₂O, 900° C. | | | | | |
| SSA (m²/g) | 69 | 84 | 88 | 89 | 86 |
| PPC (kg) | 3.9 | 3.4 | 3.5 | 3.1 | 3.5 |
| AR (%) | 99.3 | 99.4 | 99.5 | 99.5 | 99.4 |

Thus, it can be seen that in the practice of the process of the present invention it is possible to adjust as desired, by modifying the treatment time of the beads, the total pore volume and the pore volume of pores having a diameter between 100 and 1,000 Å without significantly effecting the exceptional mechanical, thermal and hydrothermal properties of the beads prepared.

EXAMPLE 5

The experiment of Example 1 was repeated, modified only with regard to the treatment medium of the alumina beads. The physical characteristics and properties of the beads prepared and the treatment medium employed are given in Table II below.

TABLE II

| Treatment medium | | | |
|---|---|---|---|
| Acid (H⁺) | | | |
| Concentration by weight per 100 g of Al₂O₃ | CH₃COOH 15% | HCl 4% | HNO₃ 7% |
| Compound (A⁻) | | | |
| Concentration by weight per 100 g of Al₂O₃ | (NH₄)₂SO₄ 12% | (CH₃CO)₂O 5% | CH₃COOCH₃ 6% |
| Characteristics of the beads obtained | | | |
| TD (g/cm³) | 0.47 | 0.45 | 0.45 |
| TPV (cm³/g) | 0.97 | 1.02 | 1.03 |
| DIS | | | |
| <100 Å | 0.01 | 0.01 | 0.01 |
| 100–1,000 Å | 0.62 | 0.66 | 0.67 |
| 1,000–5,000 Å | 0.07 | 0.08 | 0.08 |
| 5,000–10,000 Å | 0.06 | 0.08 | 0.08 |
| >10,000 Å | 0.21 | 0.19 | 0.19 |
| SSA (m²/g) | 109 | 11 | 113 |
| PPC (kg) | 4.1 | 3.9 | 3.9 |
| AR (%) | 99.8 | 99.6 | 99.7 |
| HT 982° C. | | | |
| SSA (m²/g) | 81 | 76 | 78 |
| PPC (kg) | 4.0 | 3.8 | 3.5 |
| AR (%) | 99.6 | 99.4 | 99.7 |
| Sh (%) | 0.4 | 0.8 | 0.7 |
| HT 1,093° C. | | | |
| SSA (m²/g) | 71 | 71 | 72 |

TABLE II-continued

Treatment medium

| Acid (H⁺) | | | |
|---|---|---|---|
| Concentration by weight per 100 g of Al$_2$O$_3$ | CH$_3$COOH 15% | HCl 4% | HNO$_3$ 7% |
| Compound (A⁻) | | | |
| Concentration by weight per 100 g of Al$_2$O$_3$ | (NH$_4$)$_2$SO$_4$ 12% | (CH$_3$CO)$_2$O 5% | CH$_3$COOCH$_3$ 6% |
| PPC (kg) | 3.8 | 3.6 | 3.6 |
| AR (%) | 99.3 | 99.4 | 99.6 |
| HT H$_2$O, 900° C. | | | |
| SSA (m$^2$/g) | 88 | 84 | 83 |
| PPC (kg) | 3.8 | 3.7 | 3.5 |
| AR (%) | 99.5 | 99.5 | 99.4 |

EXAMPLE 6

The experiment of Example 1 was repeated, modified only in the thermal activation conditions (temperature, time) of the beads.

The physical characteristics and properties of the beads prepared and the thermal activation conditions employed are given in Table III below.

TABLE III

| | T in ° C. | | |
|---|---|---|---|
| | 600° C. | 900° C. | 1,000° C. |
| THERMAL | | Time in hours | |
| ACTIVATION | 2 hours | 1 hour | 1 hour |
| Characteristics of the beads obtained | | | |
| TD (g/cm$^3$) | 0.46 | 0.44 | 0.44 |
| TPV (cm$^3$/g) | 100.00 | 1.05 | 1.05 |
| DIS | | | |
| <100 Å | 0.03 | 0.01 | 0.00 |
| 100–1,000 Å | 0.64 | 0.68 | 0.69 |
| 1,000–5,000 Å | 0.08 | 0.10 | 0.09 |
| 5,000–10,000 Å | 0.08 | 0.07 | 0.06 |
| >10,000 Å | 0.17 | 0.19 | 0.21 |
| SSA (m$^2$/g) | 185 | 107 | 92 |
| PPC (kg) | 3.8 | 3.6 | 3.6 |
| AR (%) | 99.7 | 99.7 | 99.7 |
| HT 982° C. | | | |
| SSA (m$^2$/g) | 75 | 75 | 75 |
| PPC (kg) | 3.3 | 3.3 | 3.3 |
| AR (%) | 99.6 | 99.6 | 99.6 |
| Sh (%) | 0.8 | 0.8 | 0.8 |
| HT 1,093° C. | | | |
| SSA (m$^2$/g) | 71 | 71 | 71 |
| PPC (kg) | 3.8 | 3.8 | 3.8 |
| AR (%) | 99.7 | 99.7 | 99.7 |
| HT H$_2$O, 900° C. | | | |
| SSA (m$^2$/g) | 84 | 84 | 84 |
| PPC (kg) | 3.4 | 3.4 | 3.4 |
| AR (%) | 99.4 | 99.4 | 99.4 |

EXAMPLE 7

This comparative example illustrates the treatment process described in U.S. Pat. Nos. 3,628,914 and 3,480,389.

The procedure of Example 1 was followed, except that the treatment medium was either nitric acid by itself, acetic acid by itself, or formic acid by itself.

The physical characteristics and properties of the beads prepared are tabulated below in Table IV.

TABLE IV

| | TREATMENT MEDIUM | | |
|---|---|---|---|
| | Nitric acid by itself 7 g per 100 g of Al$_2$O$_3$ | Acetic acid by itself 10 g per 100 g of Al$_2$O$_3$ | Formic acid by itself 6 g per 100 g of Al$_2$O$_3$ |
| CONCENTRATION | | | |
| Characteristics of the beads obtained | | | |
| TD (g/cm$^3$) | 0.49 | 0.50 | 0.50 |
| TPV (cm$^3$/g) | 0.91 | 0.89 | 0.89 |
| DIS | | | |
| <100 Å | 0.03 | 0.04 | 0.04 |
| 100–1,000 Å | 0.48 | 0.49 | 0.48 |
| 1,000–5,000 Å | 0.16 | 0.07 | 0.08 |
| 5,000–10,000 Å | 0.13 | 0.08 | 0.08 |
| >10,000 Å | 0.10 | 0.21 | 0.21 |
| SSA (m$^2$/g) | 103 | 95 | 92 |
| PPC (kg) | 3.2 | 3.1 | 3.0 |
| AR (%) | 98.1 | 98.0 | 97.5 |
| HT 982° C. | | | |
| SSA (m$^2$/g) | 54 | 47 | 45 |
| PPC (kg) | 2.8 | 2.6 | 2.5 |
| AR (%) | 97.7 | 97.5 | 97.2 |
| Sh (%) | 1.5 | 2.1 | 2.3 |
| HT 1,093° C. | | | |
| SSA (m$^2$/g) | 47 | 44 | 43 |
| PPC (kg) | 2.5 | 2.2 | 2.1 |
| AR (%) | 97.2 | 97.1 | 96.9 |
| HT H$_2$O, 900° C. | | | |
| SSA (m$^2$/g) | 49 | 49 | 48 |
| PPC (kg) | 2.9 | 2.9 | 2.7 |
| AR (%) | 97.9 | 97.8 | 97.1 |

Upon a comparison of the characteristics and properties of the alumina beads obtained in accordance with this comparison example, it is found that the beads obtained in accordance with the processes of the prior art do not possess the exceptional mechanical, thermal and hydrothermal properties of the alumina of the present invention. Furthermore, the prior art processes do not permit one to increase the total pore volume and the pore volume of pores having a diameter of between 100 and 1,000 Å to advantageous proportions.

Moreover, while the processes of the prior art lead to beads possessing a TPV which is less than the TPV obtained by the process of the present invention, they also lead to beads possessing a much lower mechanical strength (PPC).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the treatment of exhaust gases of an internal combustion engine, for the hydrogen treatment of petroleum products, for the recovery of sulfur from sulfur compounds, for dehydration, reforming, steam reforming, dehydrohalogenation, hydrocracking, hydrogenation, dehydrogenation or dehydrocyclization of hydrocarbons or other organic compounds, and for oxidation and reduction reactions, wherein alumina agglomerates are employed as a catalyst support in said process, the improvement which comprises, obtaining said alumina agglomerates by (i) preparing a ground or unground powder of active alumina having a poorly crystalline structure, an amorphous structure or an admixture of said structures;

(ii) agglomerating said active alumina powder to form alumina agglomerates;

(iii) combining (a) at least one acid selected from the group consisting of nitric acid, hydrochloric acid, perchloric acid, and sulfuric acid, and (b) at least one compound providing an anion capable of combining with aluminum ions in solution selected from the group consisting of nitrate, chloride, sulfate, perchlorate, bromoacetate and dibromoacetate salts and salts of monocarboxylic acids to form an aqueous treatment medium, wherein the concentration of the acid in the aqueous medium is less than 20% by weight and the concentration of the anion donor compound is less than 50% by weight and wherein the quantity of the acid is in an amount effective to dissolve from 0.5% to about 15% by weight of the alumina agglomerates, and subjecting said agglomerates to an aqueous medium treatment by contacting said agglomerates with said aqueous treatment medium;

(iv) subjecting the combined agglomerates and the aqueous treatment medium to a hydrothermal treatment by heating at a temperature in the range of from about 80° C. to about 250° C., wherein the combination of said aqueous medium treatment and hydrothermal treatment increases the porosity of the agglomerates by expansion; and then (v) thermally activating the agglomerates at a temperature in the range of from about 500° C. to about 1100° C., with essentially no loss of alumina agglomerates treated as a result of the combination of steps (iii)–(v).

2. The process of claim 1, wherein the hydrothermal treatment (iv) is conducted simultaneously with the aqueous medium treatment (iii).

3. The process of claim 1, wherein the agglomerates are dried prior to the thermal activation.

4. The process of claim 1, wherein the hydrothermal treatment is conducted for a period of time ranging from a few minutes to about 36 hours.

5. The process of claim 1, wherein the acid concentration is between 1% and 15% by weight.

6. The process of claim 1, wherein the compound concentration ranges from about 3% to about 30% by weight.

7. The process of claim 1, wherein the compound providing an anion capable of combining with aluminum ions in solution provides anions $A^{-n}$ which form products with aluminum ions in solution in which the atomic ratio $$n\frac{A}{Al} \leq 3.$$

8. The process of claim 1, wherein the hydrothermal treatment is conducted at a temperature in the range of from about 120 to about 220° C. for a period of time ranging from about 15 minutes to about 18 hours.

9. The process of claim 1, wherein the alumina agglomerates are comprised of a plurality of acicular platelets, said agglomerates being of an average size of from about 1 to 20 microns with at least about 50 percent of said platelets having a dimension along their axis of greatest development of between about 0.05 to 5 microns, the ratio of said dimension to the average width of said platelets ranging from about 2:1 to 20:1, and the ratio of said dimension to the average thickness of said platelets ranging from about 1:1 to 500:1.

10. The process of claim 9, wherein at least about 50 percent of said platelets have a dimension along their axis of greatest development of between about 0.1 to 2 microns.

11. The process of claim 9, wherein the ratio of said dimension along the axis of greatest development to the average width ranges from about 5:1 to 15:1 and wherein the ratio of said dimension to the average thickness ranges from about 10:1 to 200:1.

12. The process of claim 9, wherein said agglomerates are substantially spherical in shape.

13. The process of claim 9, wherein said agglomerates are between about 2 to 10 microns in dimension.

14. The process of claim 1, wherein the alumina agglomerates possess a total pore volume of between about 0.36 to about 0.75 g/cm$^3$.

15. The process of claim 1, wherein the alumina agglomerates possess a pore size distribution such that

| φ Å | <100 | 100–1,000 | 1,000–5,000 | 5,000–10,000 | >10,000 |
|---|---|---|---|---|---|
| v cm$^3$/g | 0–0.10 | 0.40–0.90 | 0–0.60 | 0–0.55 | 0–0.40 | in which Φ represents the diameter of the pores and v the volume of pores having a diameter between the limits indicated.

16. The process of claim 1, wherein the alumina agglomerates possess:

a tapped density of between about 0.36 and about 0.75 g/cm$^3$, a total pore volume of between about 0.35 and about 1.50 cm$^3$/g, a pore size distribution such that

| φ Å | <100 | 100–1,000 | 1,000–5,000 | 5,000–10,000 | >10,000 |
|---|---|---|---|---|---|
| v cm$^3$/g | 0–0.10 | 0.40–0.90 | 0–0.60 | 0–0.55 | 0–0.40 | in which Φ represents the diameter of the pores and v the volume of pores having a diameter between the limits indicated, a specific surface area of between 80 and about 200 m$^2$/g, a mechanical strength of between about 2 and 20 kg, an attrition resistance greater than 98%, a shrinkage of less than 2%, and which aluminum agglomerates after a heat treatment at 982° C. for 24 hours under dry air possess physical characteristics of a specific surface area greater than 60 m$^2$/g, mechanical strength of between 2 and 20 kg, attrition resistance greater than 98%, shrinkage less than 2%, and which alumina agglomerates after a heat treatment at 1093° C. for 24 hours under dry air possess physical characteristics of a specific surface area greater than 50 m$^2$/g, mechanical strength of between 2 and 20 kg, attrition resistance greater than 98%, and which alumina agglomerates after a hydrothermal treatment at 900° C. for 24 hours under a nitrogen atmosphere containing 10% steam possess physical characteristics of specific surface area greater than 60 m$^2$/g, mechanical strength of between 2 and 20 kg, and attrition resistance greater than 98%.

* * * * *